Patented June 3, 1952

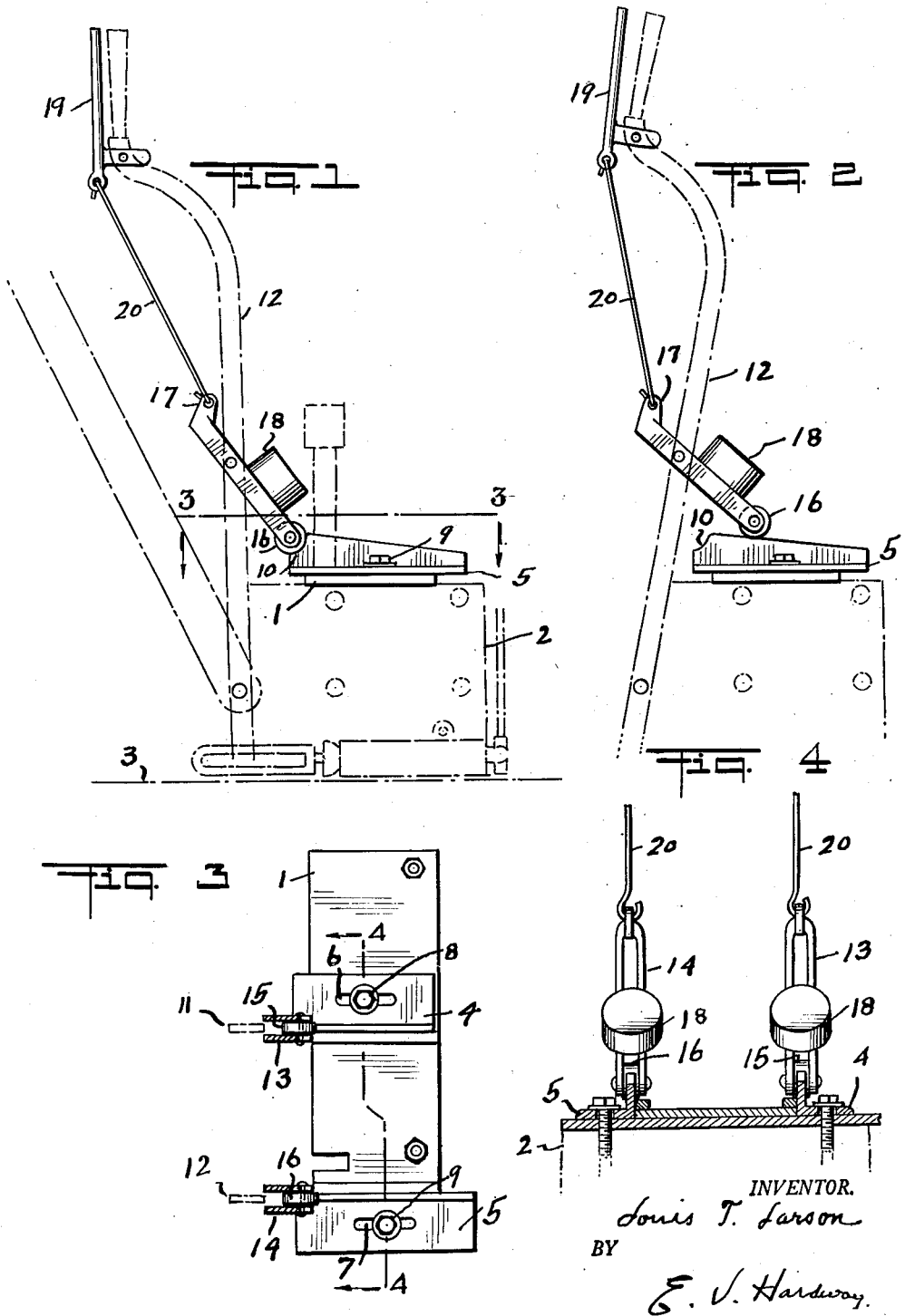

2,598,805

UNITED STATES PATENT OFFICE 2,598,805

LATCH MEANS

Louis T. Larson, Houston, Tex.

Application August 8, 1949, Serial No. 109,141

3 Claims. (Cl. 74—537)

This invention relates to latch means, and has particular relation to latching equipment for the levers of truck shovels and similar equipment.

Equipment of the character referred to which embodies a shovel of the hoist or drag-line type is equipped with levers for controlling the shovel. These levers must be manually controlled by the operator and, as at present equipped, are held in operative position by the operator so that the movement of the shovel is under the direct control of the operator. At times it may become necessary for the operator to release a lever before the cycle of operation of the shovel has been completed, and, therefore, it is desirable that said released lever be mechanically held in operative position.

It is an object of the present invention to provide a latch for the lever whereby the lever may be latched in active position and maintained in such position until voluntarily released by the operator.

It is a further object of the invention to provide latch means of the character described which are of very simple construction but very positive and effective in operation.

Other objects and advantages will be apparent from the following specification, which is illustrated by the accompanying drawings, wherein:

Figure 1 is a side elevation of the latch in active position;

Figure 2 is a side elevation thereof in released position;

Figure 3 is a horizontal, sectional view taken on the line 3—3 of Figure 1; and

Figure 4 is a vertical, sectional view taken on the line 4—4 of Figure 3.

Referring now more particularly to the drawings, the numeral 1 designates the latch plate which, in the present illustration, is shown mounted on the control box 2 which, in turn, is supported, in the present illustration, upon the flooring 3 of the truck on which the shovel is mounted.

The plate 1 is fixed in an immovable position, and mounted on it, and extending transversely with respect to it, there are the angle plates 4 and 5, which are provided with longitudinal slots 6 and 7 through which the set bolts 8 and 9 pass, said bolts being screwed into the control box 2. The plates 4 and 5 may therefore be adjusted by loosening the set bolts 8 and 9.

The forward end of the upstanding flange of each angle plate is provided with an arcuate seat 10. These plates are aligned with the levers 11, 12, which are of similar construction and which are used by the operator for controlling the shovel.

There are the U-shaped latch arms 13, 14 which embrace the corresponding levers 11, 12, and are pivoted thereto, and between the free ends of said arms there are the rollers 15, 16, which ride on the upstanding flanges of the respective plates 4 and 5. The other ends of these latch arms are provided with upstanding lugs, as 17, and mounted on the latch arms are the weights 18.

There are the grip members 19, whose lower ends have the overturned lugs which are pivoted to the upper ends of the levers 11, 12, respectively, and connecting the lower ends of the grip members 19 and the upper ends of the lugs 17 are the pull rods 20.

When the shovel is in inactive position, that is, when it is not operating, the corresponding lever will be in the position shown in Figure 2, and the roller of the corresponding latch arm will ride on the upstanding flange of the corresponding plate.

When a lever has been manipulated to set a shovel in motion and it is desired to maintain the shovel in motion but the operator is called on to perform some other duty requiring the release of the lever, said lever may be moved so that the corresponding roller, as 16, will drop into the seat 10, which will latch the corresponding lever in position to maintain the shovel in operation.

However, when it is desired to release the latch the grip member 19 may be moved toward the grip of the corresponding lever, which will exert a pull on the corresponding rod 20, thus lowering the adjacent end of the latch arm and lifting the roller out of the seat 10, thus releasing the latch and causing it to move into the position shown in Figure 2.

The weights are provided to stabilize the corresponding latches.

The plates 4 and 5 are adjustable to assure the proper location of the seats 10 so that the latch rollers may securely seat in them.

What I claim is:

1. A lever latch comprising, a latch plate, a flange upstanding therefrom and having a forwardly and upwardly sloping edge terminating at its forward end in an arcuate seat, a latch arm pivoted to said lever, a roller on one end of said arm disposed to ride on said flange and to seat in said arcuate seat to latch said lever, means securing the flange to the latch plate for adjustment thereon to move said arcuate seat toward and away from the roller, the other end of said latch arm having an upstanding lug, a grip member pivotally mounted on the lever, and a pull rod connected at one end to said grip member and at its other end to said lug.

2. A lever latch comprising, a latch plate, a flange upstanding therefrom and having a forwardly and upwardly sloping edge terminating at its forward end in an arcuate seat, a latch arm pivoted to said lever, a roller on one end of said arm disposed to ride on said flange and to seat in said arcuate seat to latch said lever, means securing the flange to the latch plate for adjustment thereon to move said arcuate seat relative to the roller, the other end of said latch arm having an upstanding lug, a grip member pivotally mounted on the lever, a pull rod connected at one end to said grip member and at its other end to said lug, and a weight on said latch arm.

3. A lever latch comprising, a latch plate, a flange upstanding from the plate and adjustable transversely of the plate, a latch arm pivoted to the lever and one end of which is provided with a bearing member, said flange having a forwardly and upwardly inclined edge provided at its forward end with an arcuate seat movable with said flange toward and away from the bearing member and adapted to receive said bearing member to latch the lever in one position, an upstanding lug at the other end of said latch arm, a gripping member pivoted to the lever, a pull rod connected at one end to one end of the grip member and at its other end to said lug, and a weight on said latch arm.

LOUIS T. LARSON.

REFERENCES CITED

The following references are of record in the file of this patent:

UNITED STATES PATENTS

| Number | Name | Date |
|---|---|---|
| 227,202 | Barker | May 4, 1880 |
| 332,434 | Pinard | Dec. 15, 1885 |
| 704,229 | Alexander | July 8, 1902 |
| 959,997 | Colhower et al. | May 31, 1910 |
| 1,294,783 | Fekete | Feb. 18, 1919 |
| 1,904,178 | Vaughn | Apr. 18, 1919 |
| 2,099,728 | Duncan | Nov. 23, 1937 |